US006413022B1

(12) United States Patent
Sarh

(10) Patent No.: US 6,413,022 B1
(45) Date of Patent: Jul. 2, 2002

(54) VACUUM CLAMP DEVICE

(75) Inventor: Branko Sarh, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 93 days.

(21) Appl. No.: 09/664,077

(22) Filed: Sep. 18, 2000

(51) Int. Cl.[7] ............................................ B23B 35/00

(52) U.S. Cl. ........................... 408/76; 408/16; 408/67; 408/95; 408/97

(58) Field of Search ............................... 29/464, 34 B; 408/16, 67, 76, 95, 97; 269/21, 91, 87.3, 43

(56) References Cited

U.S. PATENT DOCUMENTS

| | | | | |
|---|---|---|---|---|
| 633,882 | A | * | 9/1899 | Moissenet |
| 2,910,895 | A | * | 11/1959 | Winslow |
| 3,770,259 | A | | 11/1973 | Wagreich |
| 5,083,758 | A | | 1/1992 | Duke |
| 5,383,751 | A | * | 1/1995 | Wheetley et al. |
| 5,697,413 | A | * | 12/1997 | Fuller |
| 5,728,258 | A | | 3/1998 | Chung |
| 5,820,116 | A | | 10/1998 | Haese |
| 5,937,993 | A | | 8/1999 | Sheets et al. |
| 6,210,084 | B1 | * | 4/2001 | Banks et al. |

* cited by examiner

*Primary Examiner*—S. Thomas Hughes
*Assistant Examiner*—Steven Blount
(74) *Attorney, Agent, or Firm*—Harness Dickey & Pierce P.L.C.

(57) ABSTRACT

An apparatus for securing a first structure to a second structure and performing an operation on the first and second structures. The apparatus includes a frame structure, a plurality of suction cups, a clamp assembly, a conveyance mechanism and a tool. The plurality of suction cups are coupled to the frame structure and are operable in an energized mode for securing the apparatus to the first structure. The clamp assembly is coupled to the frame structure and exerts a clamping force onto the second structure when the suction cups have secured the apparatus to the first structure. The clamping force is of sufficient magnitude to retain the second structure in a predetermined position relative to the first structure. The tool is configured to perform the operation. The conveyance mechanism is coupled to both the frame structure and the tool and enables the tool to be selectively positioned relative to the frame structure. A method for coupling a first structure to a second structure is also provided.

12 Claims, 5 Drawing Sheets

VACUUM CLAMP DEVICE

TECHNICAL FIELD

The present invention relates generally to clamping tools and more particularly to a tool and method for clamping two structures together with vacuum clamps and performing an operation on them.

BACKGROUND OF THE INVENTION

BACKGROUND ART

In the manufacture of modern aircraft, it is fairly common to utilize automated riveting processes to fasten several components together. In such operations, a first component, such as a longeron, may be clamped into a fixture or jig so as to conform to a desired contour, while a second component, such as a skin, is clamped to the first component. Several holes are typically formed into the components and temporary fasteners are employed to retain the components together during the automated riveting process.

In many instances, the clamps that are employed to retain the second component to the first component, as well as the fixturing, may not be capable of exerting sufficient clamping force onto the components to eliminate gaps between the components during the forming of the holes for the temporary fasteners. Consequently, gaps are formed during the drilling process as a result of the various forces that are exerted onto the components (e.g., the force exerted by the cutting tool). Gaps between the components permit the chips that are formed during the drilling step to migrate between the components. As such, it is necessary that the components be off-loaded from the fixture, deburred, cleaned and re-loaded to the fixture prior to the installation of the temporary fasteners.

Accordingly, there remains a need in the art for a tool that can provide sufficient clamping force to the components so as to eliminate the formation of gaps between the components during a drilling operation.

SUMMARY OF THE INVENTION

In one preferred form, the present invention provides an apparatus for securing a first structure to a second structure and performing an operation on the first and second structures. The apparatus includes a frame structure, a plurality of suction cups, a clamp assembly, a conveyance mechanism and a tool. The plurality of suction cups are coupled to the frame structure and are operable in an energized mode for securing the apparatus to the first structure. The clamp assembly is coupled to the frame structure and exerts a clamping force onto the second structure when the suction cups have secured the apparatus to the first structure. The clamping force is of sufficient magnitude to retain the second structure in a predetermined position relative to the first structure. The tool is configured to perform the operation. The conveyance mechanism is coupled to both the frame structure and the tool and enables the tool to be selectively positioned relative to the frame structure.

In another preferred form, the present invention provides a method for coupling a first structure to a second structure. The method includes the steps of: providing a tool apparatus having a plurality of suction cups and a clamp assembly; energizing the plurality of suction cups to secure the tool apparatus to the first structure; employing the clamp assembly to exert a force onto the second structure that retains the second structure to the first structure; forming a hole through the first and second structures; inserting a fastener through the hole and fastening the first and second structures together; and removing the tool apparatus from the first structure after the first and second structures have been fastened together.

In yet another preferred form, the present invention provides an apparatus for securing a first structure to a second structure and performing an operation on the first and second structures. The apparatus includes a frame structure, a plurality of suction cups and a clamp assembly. The plurality of suction cups are coupled to the frame structure and operable in an energized mode that for securing the apparatus to the first structure. The clamp assembly is coupled to the frame structure and includes a fluid power cylinder having a rod that is movably coupled to the frame structure. The fluid power cylinder is operable in a first mode for moving the rod toward the second structure and exerting a clamping force that is of sufficient magnitude to retain a mating surface of the second structure against a mating surface of the first structure. The fluid power cylinder is also operable in a second mode for moving the rod away from the second structure.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
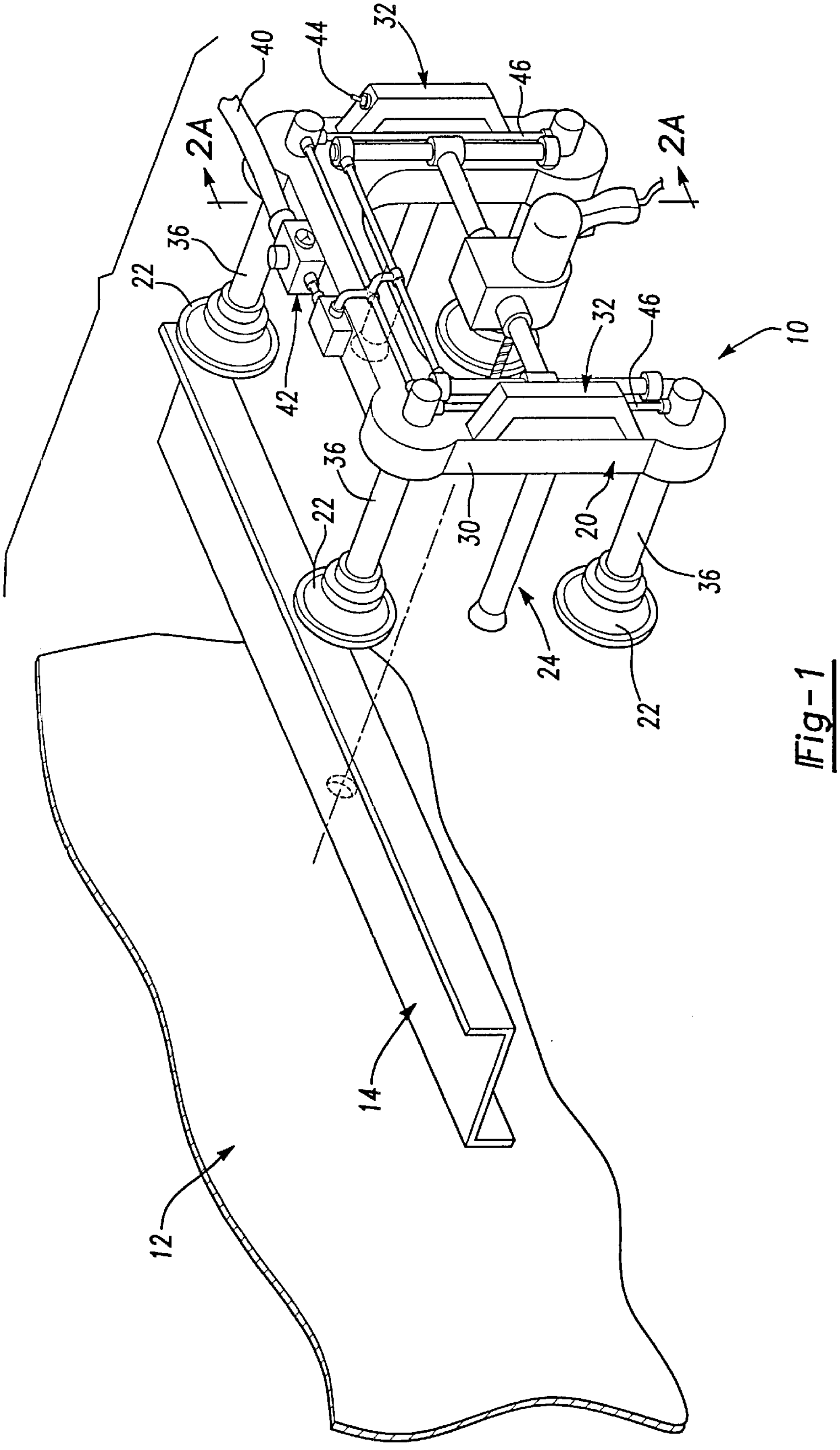
FIG. 1 is a perspective view of a tool apparatus constructed in accordance with the teachings of the present invention in operative association with a pair of structures that are to be coupled to one another.

With reference to FIG. 1 of the drawings, a tool apparatus constructed in accordance with the teachings of the present invention is generally indicated by reference numeral 10. Tool apparatus 10 is illustrated in operative association with a relatively flexible skin member 12 and a relatively stiff longeron 14. Those skilled in the art will understand that the illustration of tool apparatus 10 in conjunction with skin member 12 and longeron 14 is merely exemplary and not intended to limit the scope of the present invention in any manner.

Tool apparatus 10 is shown to include a frame structure 20, a plurality of suction cups 22, a plurality of clamp assemblies 24, a tool 26 and a conveyance mechanism 28. Frame structure 20 includes a U-shaped frame member 30 and a pair of handles 32. Frame member 30 is preferably formed from a stable but lightweight material, such as aluminum or magnesium, so as to provide a stable foundation onto which the other components of tool apparatus 10 may be mounted, as well as to minimize the mass of tool apparatus 10. Handles 32 are positioned on opposite side of frame member 30 in a manner which permits a technician to ergonomically lift and operate tool apparatus 10.

The suction cups 22 are coupled to frame structure 20, with each of the suction cups 22 being supported by a suction cup holder 36. Suction cup holders 36 include a hollow cavity 38 which causes them to be in fluid connection with a respective one of the suction cups 22. An air line 40, a vacuum generator 42 and a switch 44 are coupled to frame structure 20 which are employed to selectively operate suction cups 22 in an energized mode. Actuation of switch 44 causes pressurized air in air line 40 to flow through vacuum generator 42 and generate a corresponding supply of vacuum power. Vacuum power is transmitted through vacuum conduits 46 to each of the plurality of suction cups 22. When suction cups 22 are placed against a structure, such as skin member 12, the air contained between the structure and the vacuum fastener 22 is evacuated, causing the air pressure that acts of the opposite side of the structure to push the structure against the vacuum fastener 22. Suction cups 22, suction cup holders 36, vacuum generators 42 and switches 44 are both well known in the art and commercially available and as such, need not be discussed in greater detail herein.

Each of the clamp assemblies 24 is coupled to frame structure 20 and is adapted to exert a clamping force onto longeron 14 when suction cups 22 have been placed in the energized mode to secure tool apparatus 10 to skin member 12. The clamping force exerted by the clamp assemblies 24 is operable for retaining longeron 14 in a predetermined position relative to skin member 12, preferably such that no gap exists between the mating surfaces 50*a* and 50*b* of skin member 12 and longeron 14.

Figure 2A:
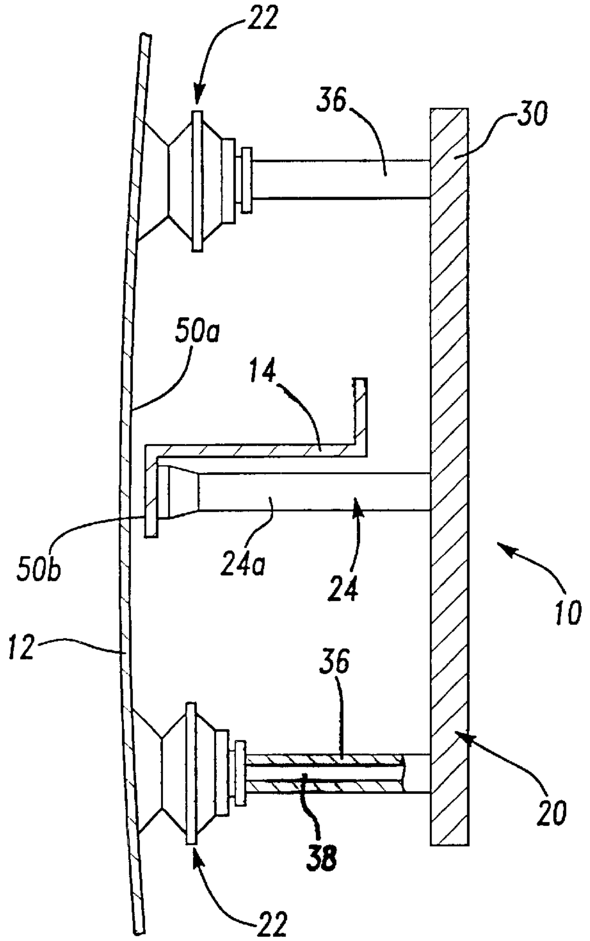
FIG. 2A is a side elevational view of a portion of the tool of FIG. 1 illustrating the suction cups in an unenergized mode.
Figure 2B:
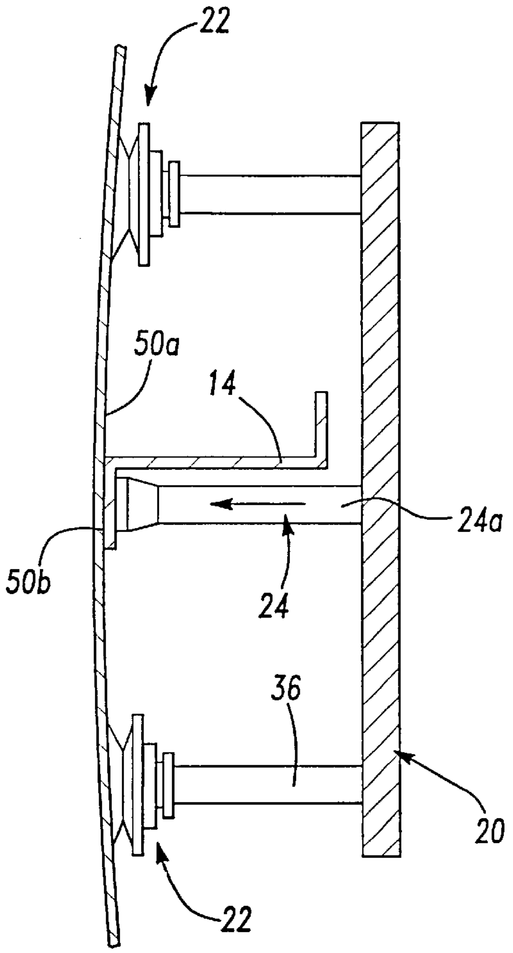
FIG. 2B is a side elevational view similar to that of FIG. 2A but illustrating the suction cups in an energized mode.
Figure 2C:
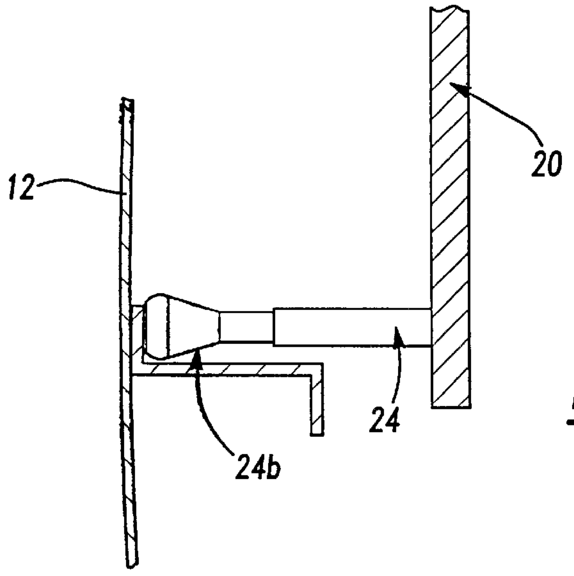
FIG. 2C is a portion of a side elevational view illustrating a clamp assembly having a resilient member.

In the particular embodiment illustrated, each of the clamp assemblies 24 includes a pin 24*a* that is fixed to frame structure 20 and extends therefrom by a predetermined distance as best shown in FIGS. 2A and 2B. However, those skilled in the art will understand that clamp assemblies 24 may be constructed somewhat differently to render tool apparatus 10 more tolerant of variation between skin member 12 and/or longeron 14, easier to set-up and/or easier to operate. In this regard, the clamp assemblies 24 preferably include an adjustment means, such as an externally threaded collar and an internally threaded receiver, which cooperate to permit the distance between the frame structure 20 and the longeron 14 to be adjusted to a desired distance. Additionally or alternatively, suction cup holders 36 may also include an adjustment means to permit the distance between suction cups 22 and frame structure 20 to be adjusted to a desired distance. Also alternatively, the clamp assemblies 24 may include a resilient element 24*b* as shown in FIG. 2C, which will deflect at a predetermined rate when the clamp assembly 24 contacts the longeron 14. Although resilient element 24*b* is shown to be a rubber leg 24*c*, those skilled in the art will understand that resilient element 24*b* may also be a conventional compression spring (not shown).

Figure 3:
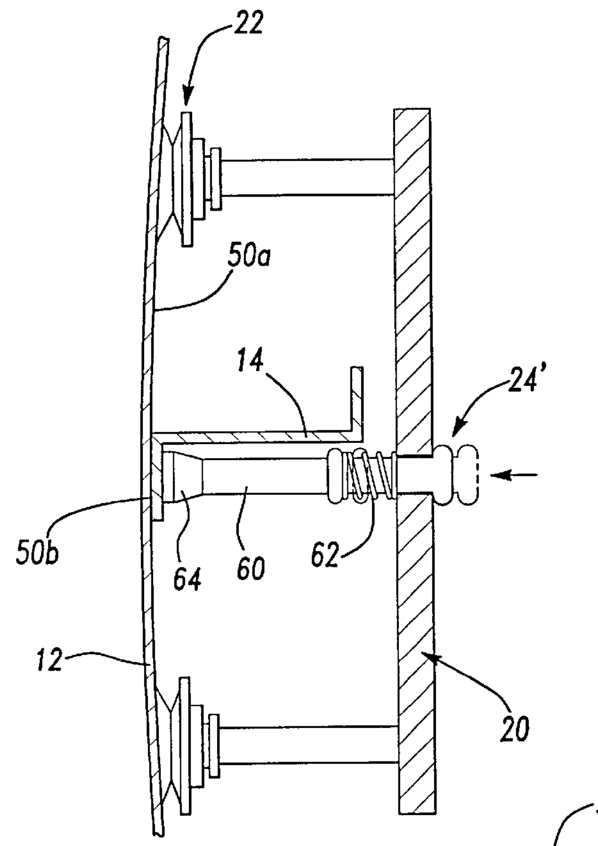
FIG. 3 is a side elevational view similar to that of FIG. 2A but illustrating a spring-biased clamp assembly.

In FIG. 3, an alternate clamp assembly 24' is illustrated as including a pin member 60 and a spring member 62. Pin member 60 is movably mounted to frame structure 20 such that its distal end 64 may be moved between a retracted position and an extended position. Spring member 62 is mounted to tool apparatus 10' and exerts the clamping force onto pin member 60.

Figure 4:
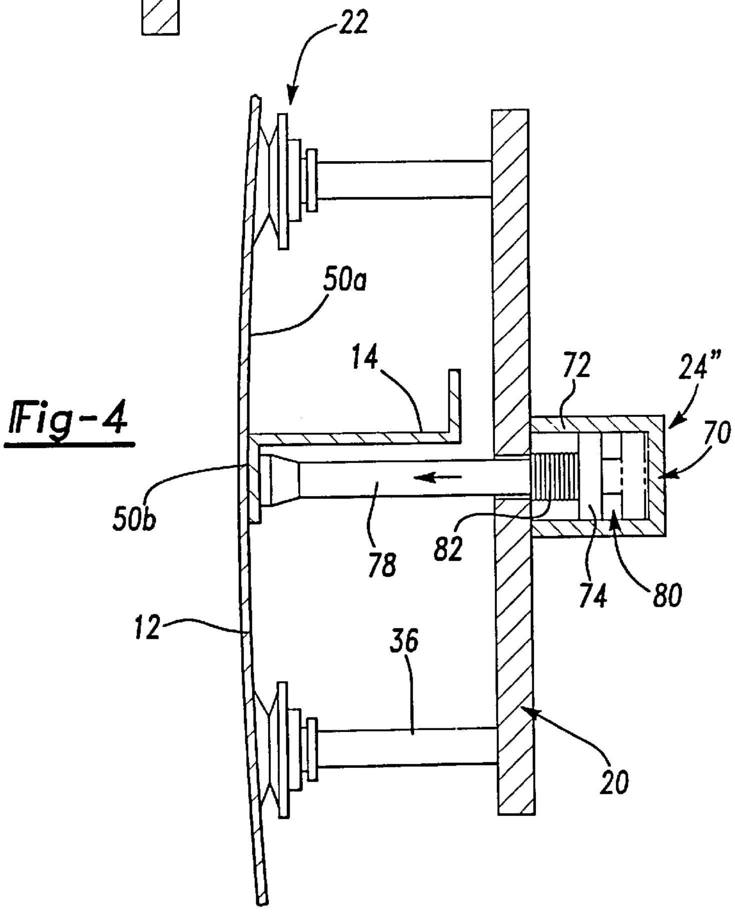
FIG. 4 is a side elevational view similar to that of FIG. 2A but illustrating a clamp assembly having a fluid power cylinder.

In FIG. 4, another alternate clamp assembly 24" is illustrated as including a fluid power cylinder 70 having a housing 72 that is mounted to frame structure 20, a piston 74 that translates within a hollow cavity 76 formed into housing 72 and a rod 78 that is fixedly coupled at its proximal end to piston 74. Fluid power cylinder 70 may be operated in a first mode wherein compressed air is introduced into a first portion 80 of housing 72. The compressed air enerates a force which acts on piston 74 to cause piston 74 to move toward the distal end of housing 72. As piston 74 and rod 78 are fixedly coupled to one another, movement of piston 74 will cause rod 78 to move toward and contact longeron 14. Fluid power cylinder 70 may also be operated in a second mode to cause the piston 74 (and rod 78) to move toward the proximal end of housing 72. In the particular embodiment illustrated, operation of fluid power cylinder 70 in the second mode entails the venting of the first position of housing 72 to permit a spring member 82 that is contained within housing 72 to exert a force onto the distal face of piston 74 to cause piston 74 to move toward the proximal end of housing 72. Those skilled in the art will understand that the operation of the fluid power cylinders 70 occur simultaneously with the activation of the suction cups 22, or that the fluid power cylinders 70 may be controlled independently of suction cups 22 to permit the longeron 14 to be clamped at a convenient time after the tool apparatus 10 is secured to the skin member 12.

Figure 5:
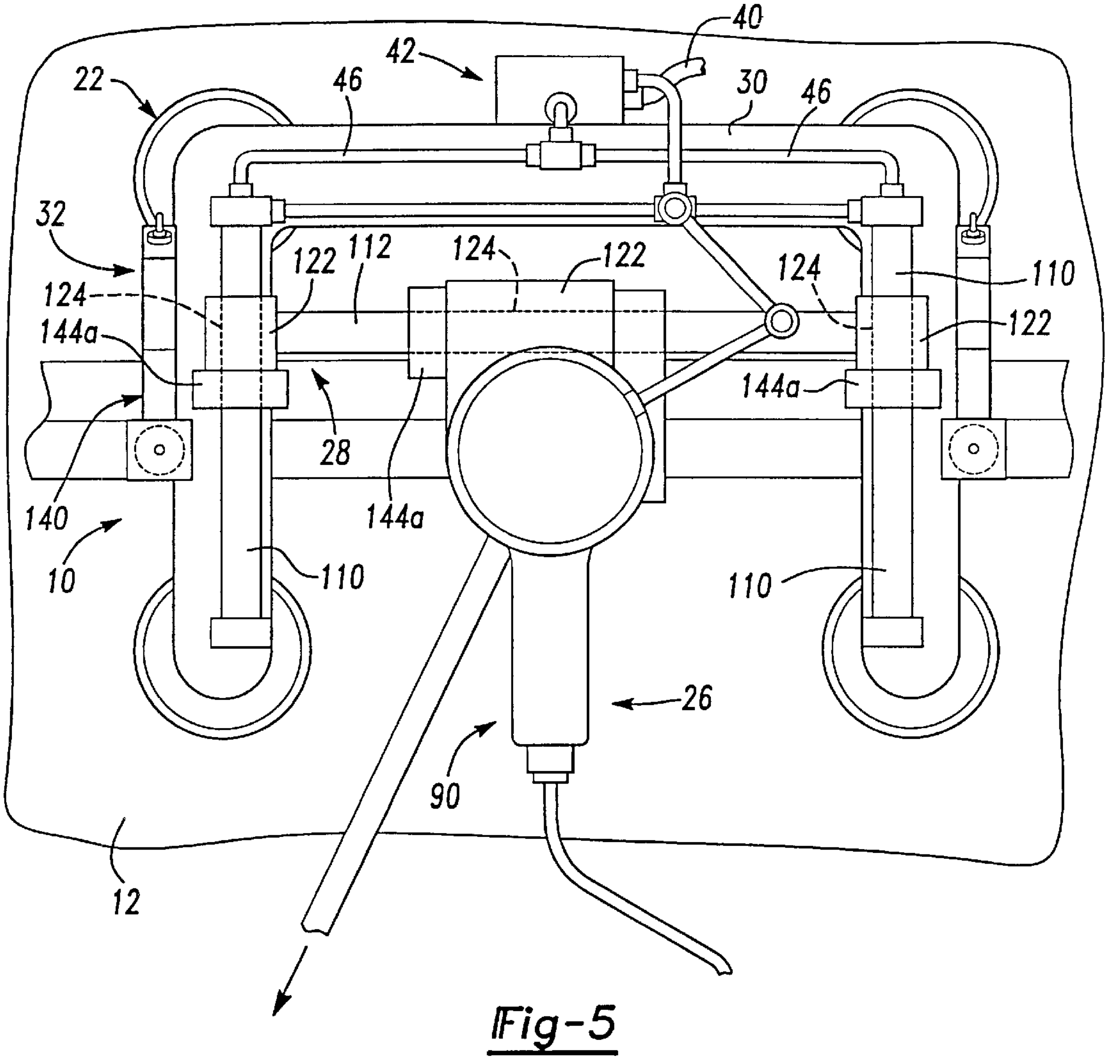
FIG. 5 is a rear elevational view of the tool of FIG. 1 in operative association with the pair of structures that are to be coupled to one another.
Figure 7:
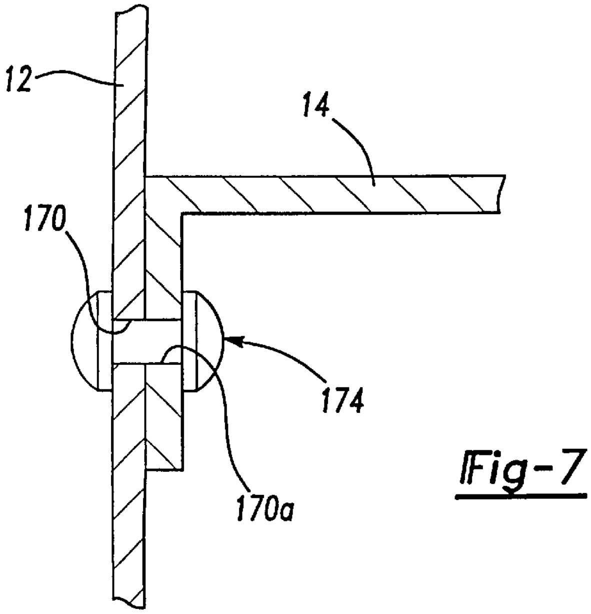
FIG. 7 is a side elevational view of a portion of the structures illustrated in FIG. 1 after they have been coupled together.
Figure 6:
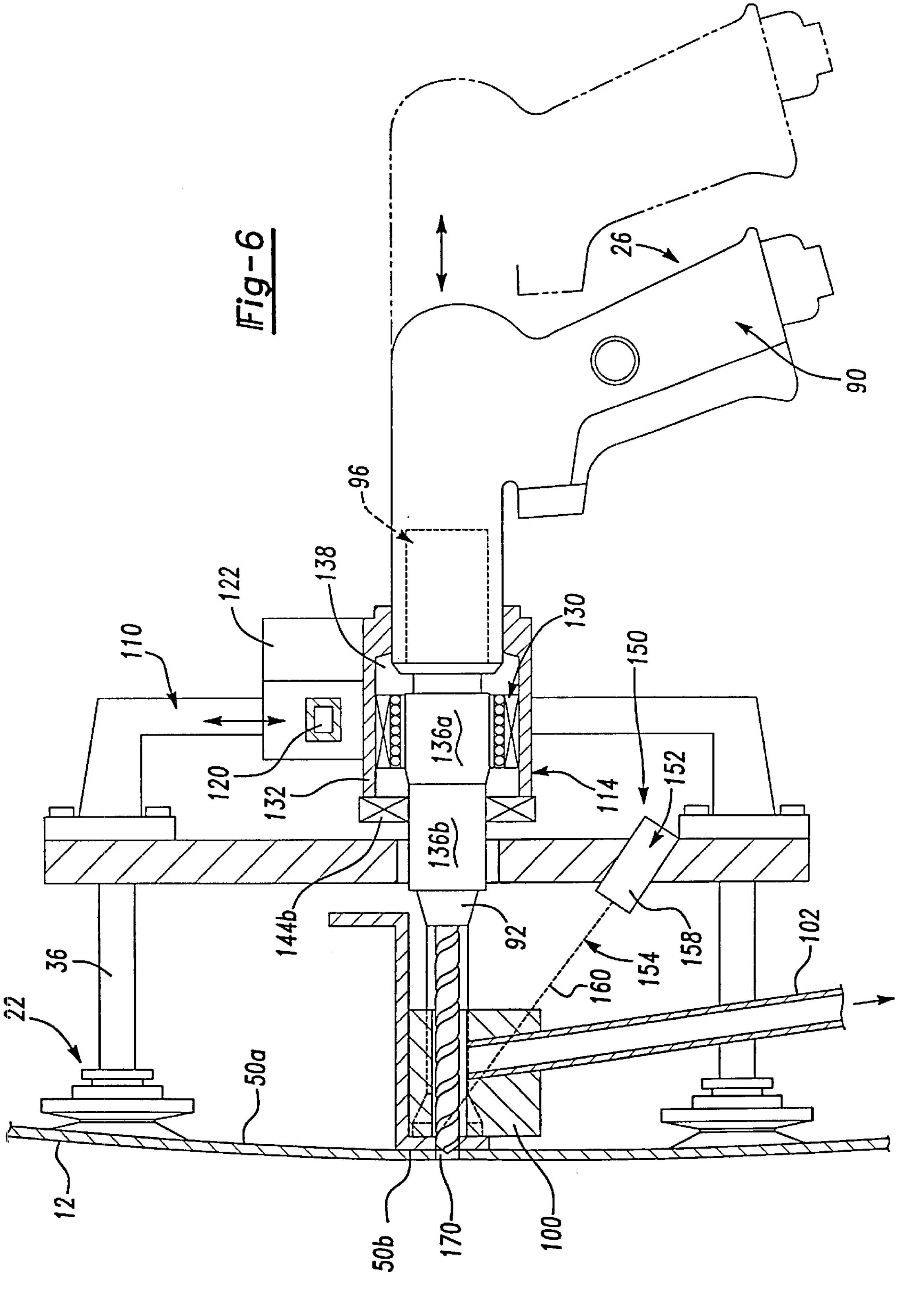
FIG. 6 is a cross-sectional view taken along the line 6—6 of FIG. 5.

Returning to FIG. 1, and with additional reference to FIGS. 5 and 6, tool 26 is illustrated to be a commercially-available, pneumatically-powered drill motor 90 having a rotatable chuck 92 for rotating a rotary cutting tool, such as a twist drill 94, and a linear feed mechanism 96 for feeding the rotary cutting tool into longeron 14 and skin member 12. In the particular embodiment illustrated, tool 26 also includes a vacuum chip removal device 100 which is connected to a source of vacuum pressure 102. A detailed discussion of vacuum chip removal device 100 is beyond the scope of this disclosure and need not be provided herein. Briefly, dust and chips that are generated by the rotary hole-forming tool are drawn by the source of vacuum pressure through the vacuum chip removal device 100 to a collection device (not shown) where the chips and dust are collected. A suitable vacuum chip removal device 100 is disclosed in commonly assigned co-pending U.S. patent application Ser. No. 09/573,433 entitled "Drill Motor Vacuum Attachment", the disclosure of which is hereby incorporated by reference as if fully set forth herein.

Conveyance mechanism 28 is illustrated to include a pair of vertically-oriented rail assemblies 110, a horizontally-oriented rail assembly 112, and a linear bushing assembly 114, each of which is arranged at a right angle relative to the other two. Each of the vertically oriented and horizontally oriented rail assemblies 110 and 112 includes a rail member 120 and slide 122 which is slidably coupled to the rail member 120. In its most basic form, the slide 122 includes a bushing which is sized to match the rail member 120 such that when the bushing and the rail member 120 are engaged to one another the slide 122 cannot be moved to any substantial degree in a direction which is perpendicular to the longitudinal axis of rail member 120.

Slide 122, however, preferably includes linear bearings 124 which permit the slide 122 to accurately track the position of the rail member 120 while moving thereon with relatively low frictional losses. Rail members 120 and slides 122 that are constructed in this latter manner are well known in the art and commercially available from NSK Corporation and Thompson Industries, Inc. and as such, need not be discussed in further detail. The opposite ends of the rail member 120 that forms a portion of the horizontally-oriented rail assembly 112 are coupled to the slides 122 of the vertically-oriented rail assemblies 110, thereby permitting the rail member 120 of the horizontally-oriented rail assembly 112 to be selectively positioned at a desired vertical spacing.

Linear bushing assembly 114 is illustrated in FIG. 6 to include a bushing assembly 130 and a housing 132. Bushing assembly 130 is fixedly coupled to a collar 136*a* formed onto drill motor 90. Housing 132 is fixedly coupled to the slide 122 of horizontally-oriented rail assembly 112 and includes a central cavity 138 through which bushing assembly 130 and a portion of drill motor 90 are disposed. Central cavity 138 is sized to slidingly engage bushing assembly 130 thereby permitting drill motor 90 to be moved along the longitudinal axis of central cavity 138 with relatively low frictional losses.

With additional reference to FIG. 5, conveyance mechanism 28 is also illustrated to include a lock device 140 that is operable in an engaged mode to inhibit relative movement between frame structure 20 and tool 26, and a disengaged mode to permit relative movement between frame structure 20 and tool 26. In the particular example provided, lock device 140 is illustrated to include a plurality of pneumatically actuated lock collars 144*a*, 144*b*. Each of the lock collars 144*a* is mounted to a slide 122 and is movable along an associated one of the rail members 120 when the lock device 140 is in the disengaged mode and the lock collar 144*a* is vented. Operation of the lock device 140 in the engaged mode wherein pneumatic pressure is applied to the lock collars 144*a* causes the lock collars 144*a* to frictionally engage an associated one of the rail members 120 to inhibit the movement of the associated slide 122. Lock collar 144*b* is mounted to the distal side of housing 132, permitting the collar 136*b* of drill motor 90 to be extended or retracted from housing 132 when lock device is in the disengaged mode and lock collar 144*b* is vented. Operation of the lock device 140 in the engaged mode when pneumatic pressure is applied to lock collar 144*b* causes lock collar 144*b* to frictionally engage collar 136*b* to inhibit movement of the drill motor 90 relative to housing 132.

To aid in the positioning of drill motor 90 relative to longeron 14 and skin member 12, tool 26 preferably includes an alignment device 150 for aligning the rotary cutting tool to a predetermined position relative to longeron 14 and/or skin member 12. In the particular embodiment illustrated, alignment device 150 is an optical sighting device 152 having a sighting portion 154 which the technician employs to align to an alignment position indicative that the drill motor 90 is in the predetermined position. As shown, optical sighting device 152 is a laser pointer device 158 which is fixedly coupled to the slide 122 of horizontally oriented rail assembly 112. Laser pointer device 158 is battery operated and produces a beam of light 160 which impacts longeron 14 at a point that coincides with the point at which the rotary cutting tool will form a hole.

In operation, tool apparatus 10 is placed proximate skin member 12 and longeron 14 and suction cups 22 are energized to secure tool apparatus 10 to skin member 12. Clamp assemblies 24 are employed to exert a lamping force onto the longeron 14 which retains the mating face 50*b* of the longeron 14 in contact with the mating face 50*a* of the skin member 12. Lock device 140 is placed in the disengaged mode to permit tool 26 to be positioned to a predetermined position for the forming of a hole 170. Alignment device 150 is employed to position tool relative to an alignment position indicative of the predetermined position at which the hole 170 is to be formed and thereafter lock device 140 is placed in the engaged mode to fix the location of tool 26 relative to frame structure 20. Tool 26 is next employed to form a hole through longeron 14 and skin member 12. Those skilled in the art will understand that the portion of the hole 170 that is formed in longeron 14 may be performed during the formation of longeron 14, for example as indicated by reference numeral 170*a*. Once the hole 170 is completely formed, lock device 140 is placed in the disengaged mode and the tool 26 is then moved to an offset position to provide increased access to the hole 170. A fastener 174, such as a rivet, a bolt or a screw, is disposed through the hole 170 and employed to fasten longeron 14 to skin member 12. Thereafter, tool apparatus 10 is removed.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An apparatus for securing a first structure to a second structure and performing an operation on the first and second structures, the apparatus comprising:

a frame structure;

a plurality of suction cups coupled to the frame structure, the suction cups operable in an energized mode that is adapted for securing the apparatus to the first structure;

at least one clamp assembly coupled to the frame structure, the at least one clamp assembly adapted to exert a clamping force onto the second structure when the suction cups have secured the apparatus to the first structure, the clamping force being operable for retaining the second structure in a predetermined position relative to the first structure;

a tool adapted for performing the operation; and a conveyance mechanism coupled to the frame structure and the tool, the conveyance mechanism operable for enabling the tool to be selectively positioned relative to the frame structure.

2. The apparatus of claim 1, wherein the conveyance mechanism includes a lock device, the lock device being operable in an engaged mode to inhibit relative movement between the frame structure and the tool, the lock device also being operable in a disengaged mode to permit relative movement between the frame structure and the tool.

3. The apparatus of claim 2, wherein the lock device is pneumatically operated.

4. The apparatus of claim 1, wherein the at least one clamp assembly includes a pin that is fixed to the frame structure and extends therefrom by a predetermined distance.

5. The apparatus of claim 1, wherein the at least one clamp assembly includes a pin member that is movably mounted to the frame structure and a spring for exerting the clamping force onto the pin member.

6. The apparatus of claim 1, wherein the at least one clamp assembly includes a fluid power cylinder having a rod that is movably coupled to the frame structure, the fluid power cylinder being operable in a first mode for moving the rod toward the second structure and exerting the clamping force onto the second structure, the fluid power cylinder also operable in a second mode for moving the rod away from the second structure.

7. The apparatus of claim 1, wherein the tool includes a rotary cutting tool.

8. The apparatus of claim 7, wherein the tool further includes a vacuum chip removal device.

9. The apparatus of claim 7, wherein the tool further includes an alignment device for aligning the rotary cutting tool to a predetermined position relative to one of the first and second structures.

10. The apparatus of claim 9, wherein the alignment device is an optical sighting device.

11. The apparatus of claim 10, wherein the optical sighting device includes a light source for generating a beam of light.

12. The apparatus of claim 1, wherein the conveyance mechanism is operable for enabling the tool to be selectively moved in three orthogonal directions.

* * * * *

UNITED STATES PATENT AND TRADEMARK OFFICE

CERTIFICATE OF CORRECTION

PATENT NO. : 6,413,022 B1
DATED : July 2, 2002
INVENTOR(S) : Branko Sarh

It is certified that error appears in the above-identified patent and that said Letters Patent is hereby corrected as shown below:

Column 5,
Line 66, “lamping” should be -- clamping --.

Column 6,
Line 13, “performed” should be -- performed --.

Signed and Sealed this

Eighteenth Day of February, 2003

JAMES E. ROGAN
*Director of the United States Patent and Trademark Office*